United States Patent [19]

Bond et al.

[11] Patent Number: 5,210,958
[45] Date of Patent: May 18, 1993

[54] PAPER WEB DRYING APPARATUS AND PROCESS

[75] Inventors: Jean F. Bond, Montreal; Reinhold H. Crotogino, Ponte Claire; W. J. Murray Douglas, Baie d'Urfé, all of Canada

[73] Assignees: McGill University, Montreal; Pulp & Paper Research Institute of Canada, Pointe Claire, both of Canada

[21] Appl. No.: 729,316

[22] Filed: Jul. 15, 1991

[51] Int. Cl.⁵ .................................................. F26B 3/04
[52] U.S. Cl. ............................................. 34/18; 34/23
[58] Field of Search .................... 34/18, 23, 114, 122

[56] References Cited

U.S. PATENT DOCUMENTS

| | | | |
|---|---|---|---|
| 2,065,032 | 12/1936 | Spooner | 34/122 |
| 2,590,849 | 4/1952 | Dungler | 34/37 |
| 2,760,410 | 8/1956 | Gillis et al. | 92/38 |
| 2,804,693 | 9/1957 | Brodie | 34/122 X |
| 2,933,826 | 4/1960 | Justus | 34/86 |
| 4,242,808 | 1/1981 | Luthi | 34/23 |
| 4,247,990 | 2/1981 | Ohls et al. | 34/23 |
| 4,615,122 | 10/1986 | Sherrod et al. | 34/18 |
| 4,780,967 | 11/1988 | Mucic | 34/86 |

FOREIGN PATENT DOCUMENTS

| | | |
|---|---|---|
| 381466 | 5/1939 | Canada . |
| 489160 | 12/1952 | Canada . |
| 505548 | 9/1954 | Canada . |
| 3240611 | 5/1983 | Fed. Rep. of Germany . |

Primary Examiner—Stephen M. Hepperle
Attorney, Agent, or Firm—Foley & Lardner

[57] ABSTRACT

A paper web is dried on a paper-making machine in two stages with the downstream stage being a superheated steam impingement dryer and the upstream stage being a conventional hollow cylinder dryer, whereby the exhaust steam from the superheated steam dryer has a major portion thereof recirculated and reheated in the superheated steam dryer, and the remaining portion of the exhaust steam is cooled and compressed to saturated steam and passed to the conventional dryer in the upstream dryer stage and enters the hollow cylinders to heat the hollow cylinders and thereby heat the paper passing over the other surface of the hollow cylinders.

11 Claims, 2 Drawing Sheets

PAPER WEB DRYING APPARATUS AND PROCESS

BACKGROUND OF THE INVENTION

1. Field of the Invention

The present invention relates to a pulp and paper process and apparatus, and more particularly, to a new method and apparatus for drying paper.

2. Description of the Prior Art

Current industrial practice is to dry paper by passing the wet paper web over a series of cylinders containing saturated steam, in an atmosphere of air. This process is characterized by a relatively low drying rate, particularly towards the dry end, and by a high energy consumption. In many mills, the dryer section limits production capacity.

In recent years, there has been proposed the drying of paper by using superheated steam. Such a proposal is described in Oscar Luthi U.S. Pat. No. 4,242,808, issued Jan. 6, 1981. In the Luthi patent, a paper web is dried by directly contacting the paper web with superheated steam to evaporate the water in the paper web by direct contact and thus cooling the superheated steam. The exhaust steam is then again superheated and the superheated steam is again used in the drying of the paper web. The Luthi method is a completely sealed and closed circuit where air is completely eliminated from the drying system. According to Luthi, the heat content per unit volume of steam is approximately 25% greater than the heat content of air. In an enclosed drying process as described by Luthi, the water content in the paper is converted to steam upon impingement of the superheated steam and is exhausted with the superheated steam. This provides additional steam in the system which is in excess of the steam required for the closed circuit even given provisions for leakage, etc. As suggested by Luthi, the excess steam can be bled off to be used in other parts of the mill.

SUMMARY OF THE INVENTION

It is an aim of the present invention to provide an improved paper drying process and apparatus which would combine both a conventional cylinder dryer and a superheated steam impingement or flow-through dryer. The excess steam which is produced in the superheated dryer circuit is bled off and treated to be used in the conventional cylinder dryer.

It is a further aim of the present invention, therefore, to provide a hybrid drying system using superheated steam in one drying operation and making use of the excess steam produced in the superheated steam circuit to heat the drums of a conventional cylinder-dryer, thus considerably reducing the energy required to dry the paper.

A process in accordance with the present invention comprises the steps of directly contacting a paper web with superheated steam to evaporate the water in the paper web, exhausting the steam, feeding and superheating a major portion of the exhaust steam to recirculate it in a closed air impervious system to be reapplied to the paper web. The remaining portion of the exhaust steam is compressed and cooled to a saturated steam condition and passed through the core of a cylinder-dryer for drying the web of paper passing on the cylinder.

An apparatus in accordance with the present invention comprises a hooded sealed dryer section through which a paper web to be dried passes, and means for forcing superheated steam to directly contact the paper web within the hooded section to evaporate the water in the paper web. Means are provided for exhausting the exhaust steam from the hooded dryer section, and means are provided for recirculating a major portion of the exhaust steam by superheating the exhaust steam before returning it to be in contact with the paper web. A hollow cylinder-dryer section is further provided for drying the paper web, cooling and compressing the exhaust steam to a saturated steam condition, and feeding the remaining exhaust steam to heat the hollow cylinder-dryer section by passing the saturated steam in the core of the hollow cylinder-dryer.

The term "cylinder-dryer" refers to a conventional dryer made up of one or more hollow cylinders in an air atmosphere, and by which such cylinders are heated by passing steam through the core of each hollow cylinder in order to heat the cylinder and indirectly the paper web passing on the outside thereof.

In a more specific embodiment of the present invention, the cylinder-dryer is located upstream of the hooded superheated steam dryer section at the dry end of a paper machine.

In a still more specific embodiment of the present invention, the means for circulating the major portion of the exhaust steam is a fan capable of raising the pressure and thus the temperature of the exhaust steam to superheated steam. In an alternative, a fan is provided for feeding the major portion of the exhaust steam to a superheater means, and conduit means communicates the superheater means with the hooded superheated steam dryer.

In a further embodiment, the fan may be replaced by a thermocompressor.

Some of the advantages of the present invention include the increase of the average drying rate of the paper since the slow drying of the conventional or cylinder-dryer is followed by relatively fast superheated steam impingement drying which can lead to an increase in paper machine speed and also to considerable capital cost savings in the dryer and of the paper machine.

Furthermore, the overall energy consumption for the dryer end is lower since the heat content of the exhaust steam of the impingement dryer section is completely recovered, either in recirculation to be converted back to superheated steam or to be used in the conventional drum dryer section.

Since all of the steam requirements for the cylinder-dryer section come from the steam exhaust of the superheated steam section, no boiler is required, thereby further reducing capital costs.

Operating experience with a superheated steam pulp dryer in Sweden (Svensson, C., "Steam Drying of Pulp", In Drying '85, A. S. Mujumdar, ed., Hemisphere, New York, 1985, pp. 301–307) and a TMP steam recovery system in the United States (K. M. Blumberg, "TMP Clean Steam Recovery for Paper Drying", Tappi Journal, Vol. 66, No. 6, pp. 69–70, 1983) has indicated that little to no degradation in purity occurs when steam is intimately mixed with moist paper fibers. Hence it is probable that steam exhausted from a superheated impingement steam dryer can be condensed directly in conventional cylinder-dryers, as long as leakage of air from the environment into the steam circuit is prevented. This can be achieved by using a proper sealing arrangement and operating the dryer under slight positive pressure.

BRIEF DESCRIPTION OF THE DRAWINGS

Having thus generally described the nature of the invention, reference will now be made to the accompanying drawings, showing by way of illustration, a preferred embodiment thereof, and in which.

DESCRIPTION OF THE PREFERRED EMBODIMENTS

Figure 1:
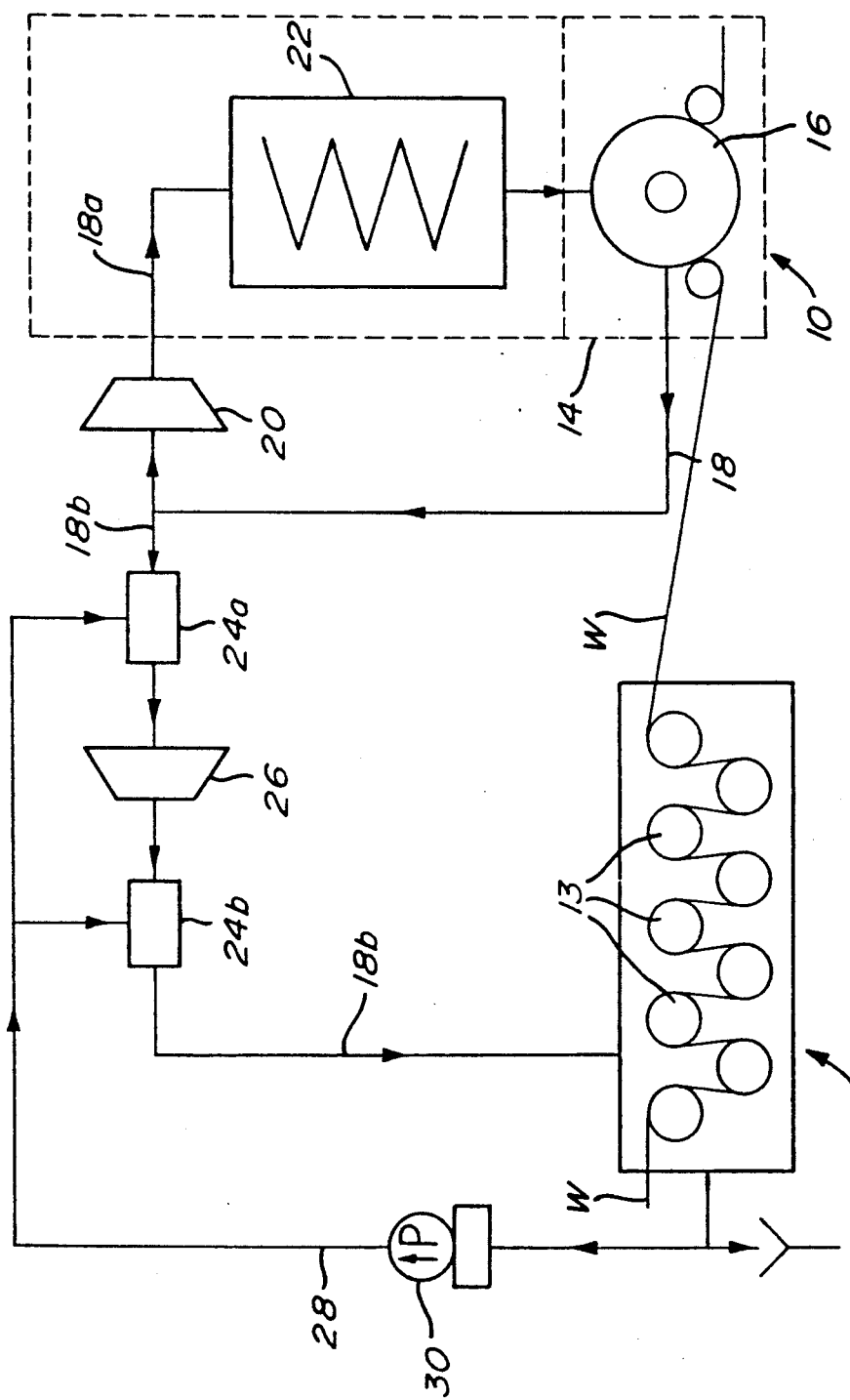
FIG. 1 is a diagrammatic view of an embodiment of the present invention.

Referring to the drawings, and in particular to FIG. 1, there is shown a diagram of a drawing and of the paper machine using a combined superheated steam dryer section 10 and a conventional hollow cylinder type dryer section 12. The superheated steam dryer section 10 includes an enclosed hooded dryer having a housing or sealed hood 14.

This hooded dryer 14 could be in the form of a Yankee dryer hood. Such dryers are well known in the industry, and a typical Yankee dryer hood is available as the "Ross Yankee Hood", manufactured by Ross Pulp and Paper Inc., now ABB Flakt, of Ville LaSalle, Montreal, Quebec, Canada. The Yankee dryer hood 14 would be provided with cross-nozzle pipes (not shown) which would allow the feeding of the superheated steam to the paper web W wrapping on a cylinder 16 in the Yankee dryer hood 14. The exhaust duct of the Yankee dryer hood 14 is shown at 18, and the exhaust steam is directed through sealed ducts. A major portion of the exhaust steam in duct 18 is diverted to be recirculated back to the Yankee dryer hood 14 by means of a fan 20.

In the present embodiment, the fan 20 is sufficient to recompress and increase the temperature of the exhausted steam through a superheater 22 which might be a series of electric elements or an indirect gas fired heat exchanger. The superheater 22 and the fan 20 increase the temperature of the recirculated exhaust steam to a superheated steam dryer inlet temperature. The inlet steam might have a temperature of 500° C. while the exhaust steam temperature might be 450° C. Thus, the fan 20 and superheater 22 are required to increase the superheated steam temperature by 50° C. as a minimum.

It is contemplated that in areas where the cost of electricity is relatively low, the temperature difference can be made up simply by the fan 20 and that the superheater 22 would be bypassed and, therefore, unnecessary. In other words, the exhaust steam in duct 18a would be compressed and the temperature increased merely by the blower fan 20 and it would not be necessary to pass the superheated steam through the superheater 22 but the superheated steam can go directly to the Yankee hood and the feed pipes in the hood 14.

A minor portion of the exhaust steam from duct 18b is diverted through a first desuperheater 24 which has the purpose of cooling down the exhaust steam in duct 18b to a saturated steam temperature level. This steam in duct 18b is then compressed by a compressor 26 and, in turn, the compressed steam is once again subjected to a desuperheater in order to again reduce the temperature of the saturated steam. The saturated steam in duct 18b is then passed through the inner cores of the hollow cylinders 13 in the conventional cylinder-dryer 12.

As is well known, the principle of the cylinder-dryers is to indirectly heat the paper web W, passing over the outer surfaces of the cylinders 13, while heating the inner surface of the hollow drums by steam which may be a compressed steam in order to have the highest possible temperature within a saturated steam condition. The steam, when it enters the hollow cylinders 13, condenses against the inner wall of the cylinder, providing a thin water layer, and the heat from the steam is thus exchanged through the drum wall to the paper web W.

Some of the cooler condensed water which is drained from the conventional dryer 12 can be recirculated along the line 28 to the desuperheaters 24a and 24b. The desuperheaters may be in the form of a direct contact heat exchanger where the cooler condensed water is mixed with the steam. A pump 30 is shown in the line 28 to circulate the condensed water from the dryer section 12.

The rest of the condensed water can be drained. It is contemplated that the desuperheaters 24a and 24b can be integral with the compressor 26 as in a wet steam compressor.

Such compressors 26 are well known from the art and are described in an article entitled "Recover Heat by Mechanical Vapor Recompression" by F. E. Becker et al, in Hydrocarbon Processing, May 1985, pp. 77-80.

These steam compressors are also discussed in an article entitled "High Pressure Ratio Centrifugal Compressor Development and a Vapor Compression Application in the Dairy Industry" by J. J. Tuzson, which is part of the Second International Symposium on The Large Scale Applications of Heat Pumps, September 25-27, 1984, held at York, England.

The drying load is split between the conventional and steam impingement drying sections 12, 10 so as to exactly balance steam consumption in the former by steam production in the latter. The impingement dryer 10 is to be operated at nominally atmospheric pressure, owing to the high cost and operational hazards inherent to high pressure operation. Since the steam exhausted from the impingement dryer is generally superheated, it must be desuperheated by mixing with a condensate stream before being sent to the conventional dryer section 12, because drying cylinders perform erratically with superheated steam. Calculations of the compressor work per unit mass steam exhausted from the impingement dryer show that it is advantageous to desuperheat the exhaust steam prior to compressing, because the effect of the temperature decrease in reducing the work required more than offsets the effect of the mass flow rate increase.

In conventional paper dryers, the energy required to dry the paper is supplied in the form of the latent heat of steam generated by the combustion of a fossil fuel. The energy consumption is usually expressed as the number of kilograms of steam required to remove one kilogram of water from the sheet. This figure averages 1.5 in Canadian paper machines. By contrast, a hybrid steam impingement and conventional dryer of the present invention arrangement consumes a significant portion of its energy as the work required to circulate the steam around the impingement dryer circuit and to compress the exhaust steam to the conventional dryer section. Calculations show that, under typical conditions, the overall energy consumption of the processes of this invention is about half of that of conventional dryers when due account is taken of the different values of heat and work energy.

In an example using a superheated steam impingement dryer having a 60 meter square impingement surface, the impinging steam mass flow rate was 100,000 kg/hr., and the water removal rate in the dryer from the paper web was 10,000 kg/hr. The present disclosure is based on a paper presented at the 40th Canadian Chemical Engineering Conference at Halifax, Nova Scotia, from July 15–20, 1990, entitled "Cycles for Implementing Superheated Steam Drying of Paper" by J. F. Bond et al. This paper will be part of a doctoral thesis by J. F. Bond to be made public in September 1991 at McGill University, Montreal, Canada, and is incorporated herein by reference.

Figure 2:
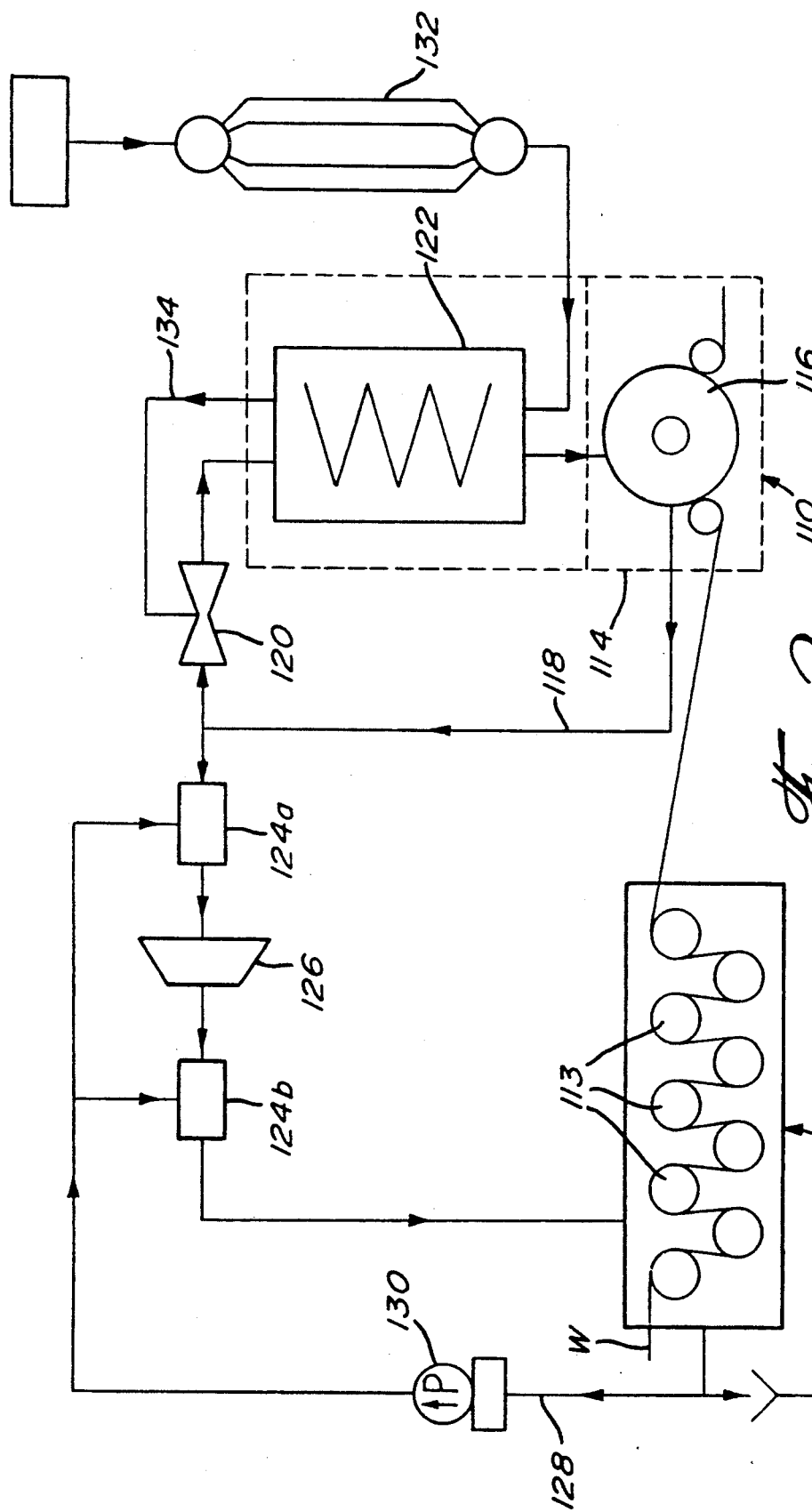
FIG. 2 is a diagrammatic view of a second embodiment of the present invention.

FIG. 2 shows a diagram in which a thermocompressor replaces the fan. The thermocompressor is illustrated by the number 120 in FIG. 2. All of the other elements in the diagram of FIG. 2 which are similar to FIG. 1 have been raised by the numeral 100. It is possible to use a thermocompressor to boost the pressure of the exhaust steam from line 118. In the thermocompressor 120, a high pressure motive stream is mixed with a low pressure induced steam and the combined steam is discharged at an intermediate pressure. Because of their low cost and simplicity of maintenance, thermocompressors are an attractive alternative to mechanical compressors.

The motive stream from line 134 comes from a boiler 132 which provides high pressure steam to be mixed with the recirculating stream of exhaust steam from line 118. The pressure of the resulting stream is thus increased. The intermediate pressure is between the high pressure coming from the boiler and the pressure of the recirculating stream of exhaust steam duct at 118. The thermocompressor has the advantages of saving electrical power required to do the circulation in this cycle and also the thermocompressor compressor is less costly than a fan. It is also contemplated to superheat the motive steam prior to injecting it into the thermocompressor in order to improve the performance of the thermocompressor.

We claim:

1. A process for drying a web of paper in a papermaking machine comprising the steps of directly contacting the paper web with superheated steam to evaporate the water in the paper web, exhausting the steam, feeding and superheating a major portion of the exhausted steam to recirculate it in a closed, air impervious system to be reapplied to the paper web, diverting the remaining portion of the exhausted steam, compressing it and cooling it to a saturated steam condition and passing the saturated steam through a cylinder-dryer for drying the web of a paper passing on the cylinder-dryer.

2. A process for drying a paper web as defined in claim 1, wherein the cylinder-dryer includes a plurality of hollow cylinders in series in a drying section upstream from the superheated steam drying section on the paper web.

3. A process as defined in claim 1, wherein the major portion of the exhaust steam is heated to superheated steam temperatures and is forced to impinge on the paper web passing over a cylinder in the superheated steam section.

4. An apparatus for drying a web of paper in a papermaking machine comprising a hooded, sealed dryer section to which a paper web to be dried is passed, means for forcing superheated steam to directly contact the paper web within the hooded section to evaporate the water in the paper web, means for exhausting the exhaust steam from the hooded dryer section and means provided for recirculating a major portion of the exhaust steam by superheating the exhaust steam before returning it to be in contact with the paper web, a further dryer section including at least a hollow cylinder, means for passing the paper web over the further dryer cylinder, means for cooling and compressing the exhaust steam not being recirculated in the superheated dryer and passing the saturated steam to the further dryer section and through the core of the hollow cylinders to heat the cylinders and thus the paper passing on the outer surfaces of the cylinder.

5. An apparatus as defined in claim 4, wherein the further dryer section is upstream of the superheated steam dryer section on the paper web and all of the steam required to heat the hollow cylinders of the further drying section is derived from the exhaust steam coming from the superheated dryer section.

6. An apparatus as defined in claim 4, wherein the means for feeding the major portion of the exhaust steam is a fan capable of raising the pressure and temperature of the exhaust steam to superheated steam.

7. An apparatus as defined in claim 4, wherein the means for feeding the major portion of the exhaust steam includes a fan and a superheater means is provided downstream of the fan for raising the temperature of the major portion of the exhaust steam to superheated steam, and conduit means are provided between the superheater means and the hooded superheated steam dryer so that the recirculated superheated steam passes into the hooded dryer portion.

8. An apparatus as defined in claim 4, wherein the means for circulating the major portion of the exhaust steam includes a thermocompressor adapted to receive a motive stream of steam from an independent steam source and to mix with the recirculated exhaust steam to increase the pressure of the exhaust steam, and superheater means for heating the exhaust steam and mixed motive stream of steam to a superheated steam condition before passing the superheated steam to the hooded dryer section.

9. A process for drying a web of paper in a papermaking machine comprising the steps of directly contacting the paper web with superheated steam at a predetermined dryer inlet temperature to evaporate the water in the paper web, exhausting the superheated steam, recirculating a major portion of the exhausted superheated steam in a closed, air impervious system to be re-applied to the paper web, increasing the pressure and thus the temperature of the exhaust superheated steam to the superheated steam dryer inlet temperature without adding heat from an external source before bringing it into contact with the paper web.

10. An apparatus for drying a web of paper in a papermaking machine comprising a hooded, sealed dryer section to which a paper web to be dried is passed, means for forcing superheated steam at a predetermined dryer inlet temperature to directly contact the paper web within the hooded section to evaporate the water in the paper web, means for exhausting the exhaust superheated steam from the hooded dryer section in a closed, air impervious system and compressor means provided for recirculating a major portion of the exhaust superheated steam to the hooded dryer, whereby said compressor means increases the pressure and thus the temperature of the exhaust superheated steam to superheated steam dryer inlet temperature without external heat means.

11. A process as defined in claim 9, wherein the predetermined dryer inlet temperature is approximately 500° C. and the exhaust superheated steam temperature is 450° C.

* * * * *